(12) United States Patent
Eggiman et al.

(10) Patent No.: US 6,702,698 B2
(45) Date of Patent: Mar. 9, 2004

(54) BAT WITH COMPOSITE HANDLE

(75) Inventors: Michael D. Eggiman, North Plains, OR (US); Douglas G. Guenther, Wheaton, IL (US); Mark A. Fritzke, Portland, OR (US)

(73) Assignee: Wilson Sporting Goods Co., Chicago, IL (US)

( * ) Notice: Subject to any disclaimer, the term of this patent is extended or adjusted under 35 U.S.C. 154(b) by 0 days.

(21) Appl. No.: 10/438,489

(22) Filed: May 15, 2003

(65) Prior Publication Data

US 2003/0195066 A1 Oct. 16, 2003

Related U.S. Application Data

(62) Division of application No. 10/115,593, filed on Apr. 2, 2002.

(51) Int. Cl.⁷ .................................................. A67B 59/06
(52) U.S. Cl. ..................................... 473/566; 473/567
(58) Field of Search ................................. 473/564–568, 473/457, 519, 520

(56) References Cited

U.S. PATENT DOCUMENTS

| | | | | |
|---|---|---|---|---|
| 3,877,698 A | * | 4/1975 | Volpe | 473/520 |
| 4,025,377 A | * | 5/1977 | Tanikawa | 156/242 |
| 5,409,214 A | * | 4/1995 | Cook | 473/564 |
| 5,593,158 A | * | 1/1997 | Filice et al. | 473/520 |
| 6,056,655 A | * | 5/2000 | Feeney et al. | 473/567 |
| 6,432,006 B1 | * | 8/2002 | Tribble | 473/564 |
| 6,485,382 B1 | * | 11/2002 | Chen | 473/566 |
| 6,511,392 B1 | * | 1/2003 | Chohan | 473/564 |

* cited by examiner

Primary Examiner—Mark S. Graham
(74) Attorney, Agent, or Firm—Klarquist Sparkman LLP; Terence P. O'Brien

(57) ABSTRACT

A bat has an elongate tubular striking member of a first material, and an elongate handle member of a second material. The handle may be of composite material laid up in selected layers and orientation to produce selected weight distribution, strength, and stiffness and improved batting capabilities. The striking member and handle member may have juncture sections which are substantially rigidly interconnected through mating configurations.

9 Claims, 5 Drawing Sheets

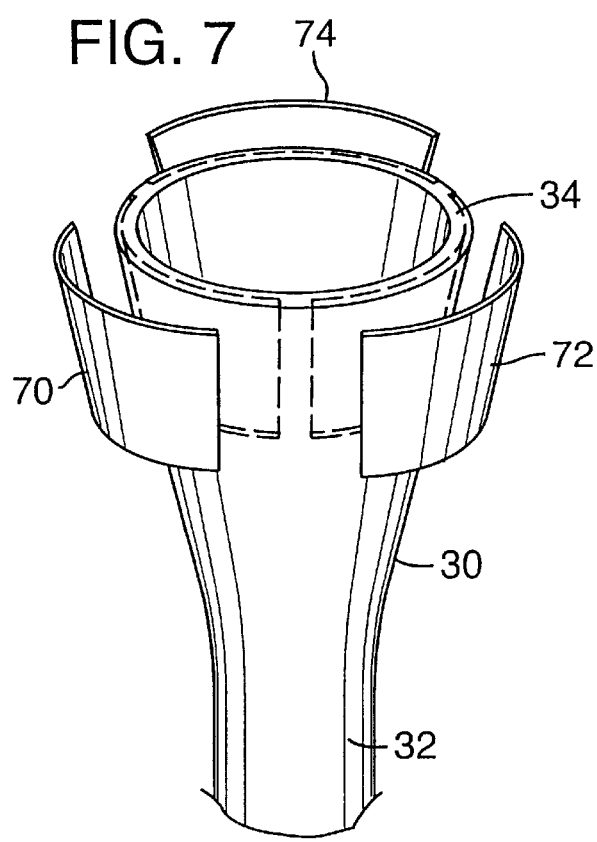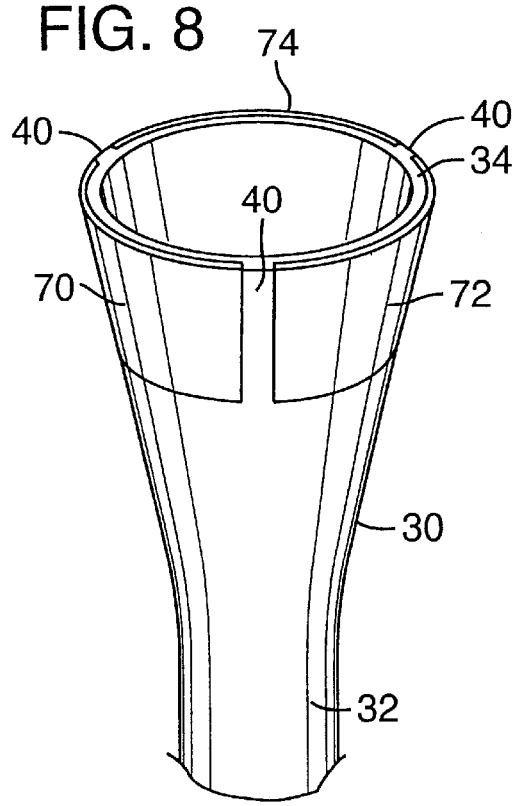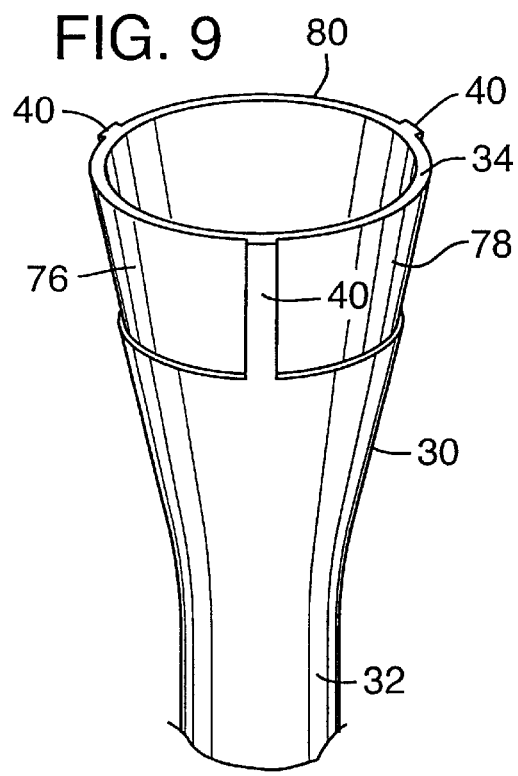

BAT WITH COMPOSITE HANDLE

The present application is a division of U.S. patent application Ser. No. 10/115,593, entitled "Bat With Composite Handle," filed on Apr. 2, 2002 by Eggiman et al pending.

FIELD OF THE INVENTION

This invention relates to a ball bat, and more particularly to a ball bat with a striking barrel member made to provide desired striking capabilities, and a handle member made to provide desired swinging capabilities, and a method for manufacturing such which produces a rigid interconnection between the barrel and handle members.

BACKGROUND AND SUMMARY OF THE INVENTION

Tubular metallic baseball bats are well known in the art. A familiar example is a tubular aluminum bat. Such bats have the advantage of a generally good impact response, meaning that the bat effectively transfers power to a batted ball. This effective power transfer results in ball players achieving good distances with batted balls. An additional advantage is improved durability over crack-prone wooden bats.

Even though presently known bats perform well, there is a continuing quest for bats with better hitting capabilities. Accordingly, one important need is to optimize the impact response of a bat. Further, it is important to provide a bat with proper weighting so that its swing weight is apportioned to provide an appropriate center of gravity and good swing speed of impact components during use.

Generally speaking, bat performance may be a function of the weight of the bat, distribution of the weight, the size of the hitting area, the effectiveness of force transfer between the handle and the striking barrel, and the impact response of the bat. The durability of a bat relates, at least in part, to its ability to resist denting or cracking and depends on the strength and stiffness of the striking portion of the bat. An attempt to increase the durability of the bat often produces an adverse effect on the bat's performance, as by possibly increasing its overall weight and stiffness, or having less than optimum weight distribution.

It has been discovered that a hitter often can increase bat speed by using a lighter bat, thereby increasing the force transferred to the ball upon impact. Thus it would be advantageous to provide a bat having a striking portion which has sufficient durability to withstand repeated hitting, yet which has a reduced overall bat weight to permit increased bat speed through use of an overall lighter weight bat.

It also has been discovered that greater hitting, or slugging, capability may be obtained by providing a bat with a handle made of a material different from the material of the striking portion or formed in such a manner as to have different capabilities. One manner for providing such is to produce a bat with a composite handle, wherein the composite material may be structured to provide selected degrees of flexibility, stiffness, and strength. For example, in one hitting situation it may be best to have a bat with a more flexible handle, whereas for other hitting situations it is advantageous to have a handle with greater stiffness.

An example of a prior attempt to provide a bat with a handle connected to a barrel section is shown in U.S. Pat. No. 5,593,158 entitled "Shock Attenuating Ball Bat." In this patent an attempt was made to produce a bat with handle and barrel member separated by an elastomeric isolation union for reducing shock (energy) transmission from the barrel to the handle, and, inherently from the handle to the barrel. Accordingly, such a design does not allow for maximum energy transfer from the handle to the barrel during hitting. As a result, the bat produces less energy transfer or impact energy to the ball due to the elastomeric interconnection between the handle and barrel.

Therefore there is a continuing need for a bat that provides the flexibility of a separate handle member and striking member and maximizes the energy transfer between the two members.

The present invention provides an improved bat with a striking portion with good durability and striking capabilities and a handle portion with desirable weight and stiffness characteristics to permit greater bat speed during hitting.

One embodiment of the invention provides a bat having an elongate tubular striking member with a juncture section which converges inwardly toward the longitudinal axis of the bat on progressing toward an end of the striking member, and an elongate handle member having an end portion thereof which is firmly joined to the converging end portion of the striking member to provide a rigid interconnection therebetween to permit substantially complete striking energy transfer between the handle member and the striking member.

In another embodiment, the bat has an elongate tubular striking member having a juncture section adjacent its proximal end, the striking member being composed of metal having a first effective mass, and an elongate handle member composed of a material having a second effective mass which is less than the first effective mass of the striking member, the handle member having a juncture section adjacent its distal end, with the juncture sections of the striking member and handle member overlapping and being joined together to provide a rigid interconnection therebetween to permit substantially complete striking energy transfer between the striking member and the handle member on hitting. Because the handle member is of a lower effective mass it will help to produce a lighter weight bat with the possibility of a greater swing speed.

The present invention provides a novel bat and method for producing the same wherein the striking portion is comprised of the most appropriate, or optimum, structure for striking and the handle is comprised of the most appropriate, or optimum, structure for swinging, and the two are joined for optimum slugging capability.

The present invention provides a bat, and method for making a bat, wherein selected materials are used in selected portions of the bat to achieve proper weight, or mass, distribution for optimum swing speed and to provide desired strength and stiffness of selected portions.

The present invention contemplates producing a handle member with multiple composite layers which are appropriately oriented and joined to provide a handle which has selected strength and stiffness. By providing a bat with a handle member made of composite material which may be laid up in multiple layers with selected orientation and strength, the handle member may be structured to provide selected degrees of strength, flexibility, and vibration transfer in an assembled bat.

In one embodiment, one of the juncture sections of the striking member or the juncture section of the handle member has projections thereon which extend radially from remainder portions of the juncture section a distance substantially equal to the thickness of a desired layer of adhesive to join the striking member and handle member. Such projections firmly engage the facing surface of the other member and this, in conjunction with the adhesive applied between the two members, provides a firm interconnection therebetween.

An object of the present invention is to provide a method for producing an improved bat having characteristics as set out above.

BRIEF DESCRIPTION OF THE DRAWINGS

FIGS. 7–9 are perspective views of a flared end portion of the handle with forming members associated therewith during the production of the handle member to produce projecting ribs on the juncture section of the handle.

DETAILED DESCRIPTION

Figure 1:
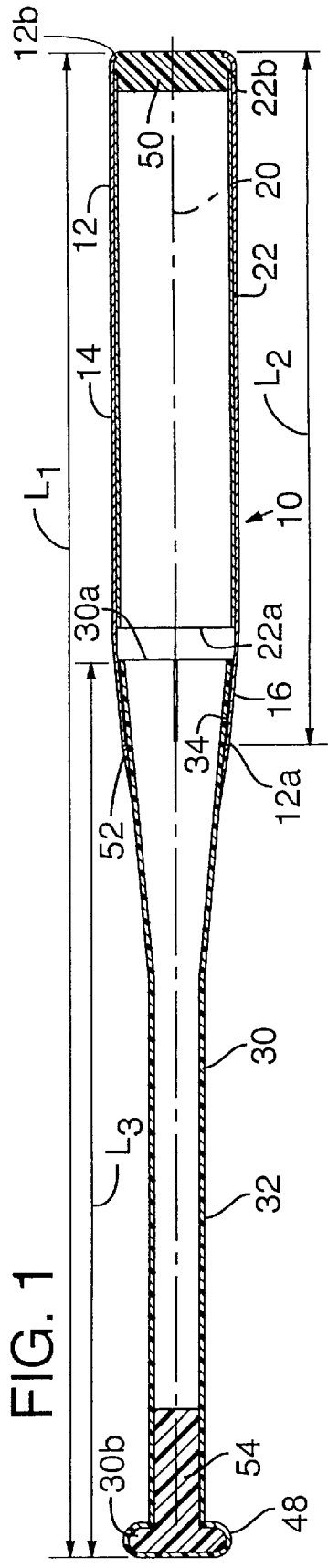
FIG. 1 is a sectional view through the longitudinal center of a bat in accordance with one embodiment of the invention.

Referring to FIG. 1, an elongate tubular ball bat 10 having a longitudinal axis, or centerline, 20 comprises an elongate tubular striking member 12. The striking member has a proximal, or inner, end 12a and a distal, or outer, end 12b. A striking region 14 is disposed intermediate ends 12a, 12b. A frusto-conical juncture section 16 of the striking member adjacent end 12a converges toward centerline 20 on progressing toward end 12a.

Figure 2:
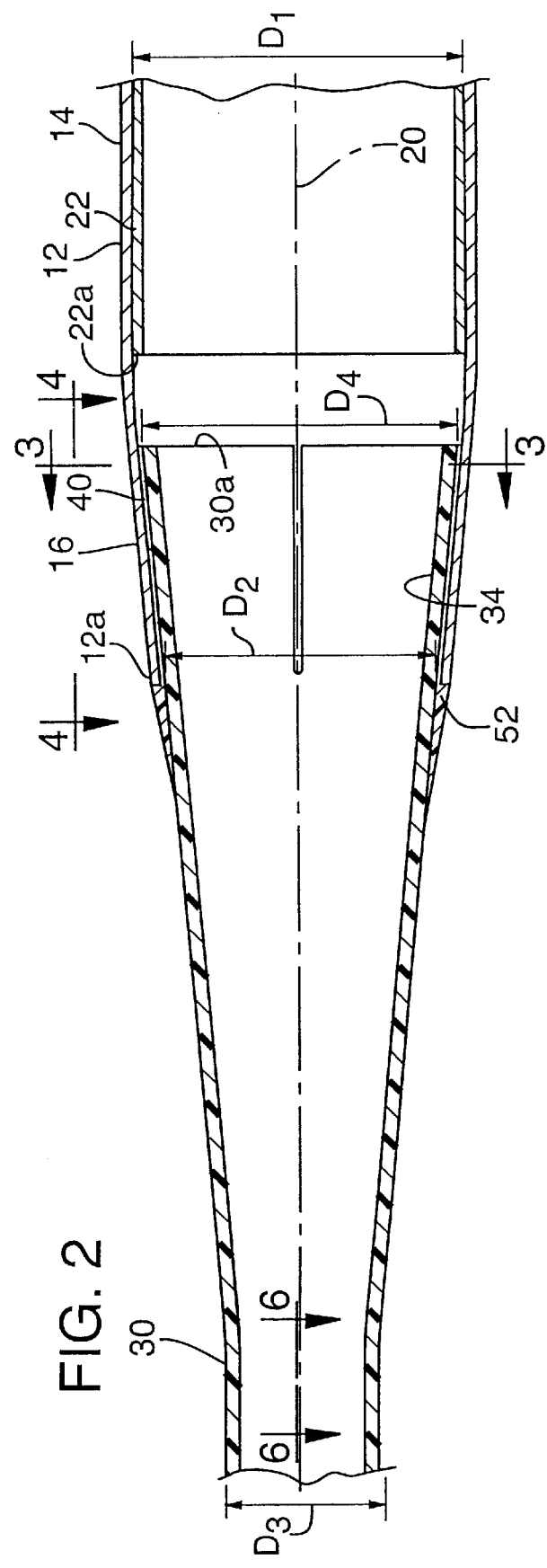
FIG. 2 is a magnified sectional view of a juncture section of the bat of FIG. 1.

In the embodiment illustrated in FIGS. 1 and 2 striking region 14 has a substantially cylindrical inner cavity, with an inner diameter $D_1$. A cylindrical tubular insert 22 is received in the striking region cavity to form a multiple-wall bat. The insert has proximal, or inner, and distal, or outer, ends 22a, 22b, respectively. End 22a is disposed adjacent juncture section 16. The bat also could be made as a single-wall bat without insert 22.

Juncture section 16 has a major diameter equal to $D_1$ and a minor diameter noted $D_2$ at its end 12a.

An elongate tubular handle member 30 is secured to and projects longitudinally outwardly from end 12a and juncture section 16 of the striking member.

The assembled bat 10 has an overall length $L_1$. Striking member 12 has a length $L_2$ and handle member 30 has a length $L_3$. As seen lengths $L_2$ and $L_3$ are each substantially less than $L_1$.

The handle member 30 in the illustrated embodiment may be made of a composite material or other appropriate material as will be discussed in greater detail below. It has opposed distal, or outer, end 30a, and proximal, or inner, end 30b. The handle member has an elongate, hollow, tubular, substantially cylindrical gripping portion 32 of a diameter $D_3$ throughout a major portion of its length, and a frusto-conical juncture section 34 adjacent end 30a. As best seen in FIGS. 1 and 2, juncture section 34 diverges outwardly from the longitudinal axis in a configuration complementary to the converging portion of juncture section 16 of the striking member. Juncture section 34 has a minor diameter $D_3$ (less than $D_2$), a major diameter $D_4$ (greater than $D_2$, but less than $D_1$), and a length which is no greater than 25% of the overall length $L_1$ of the assembled bat.

End 12a of striking member 12 provides an opening with a diameter $D_2$ greater than diameter $D_3$ of gripping portion 32 of handle member 30. The diverging portion of juncture section 34 of the handle member is such that the outer surface of juncture section 34 is substantially complementary to the configuration of the inner surface of juncture section 16 of the striking member so that they may fit in close contact with each other when assembled as illustrated in FIGS. 1 and 2.

Figure 3:
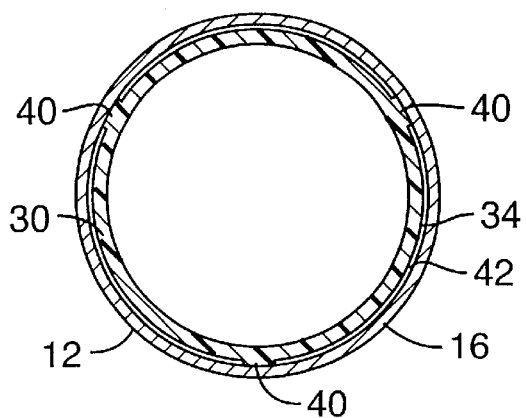
FIG. 3 is a cross sectional view taken generally along the line 3—3 in FIG. 2.
Figure 4:
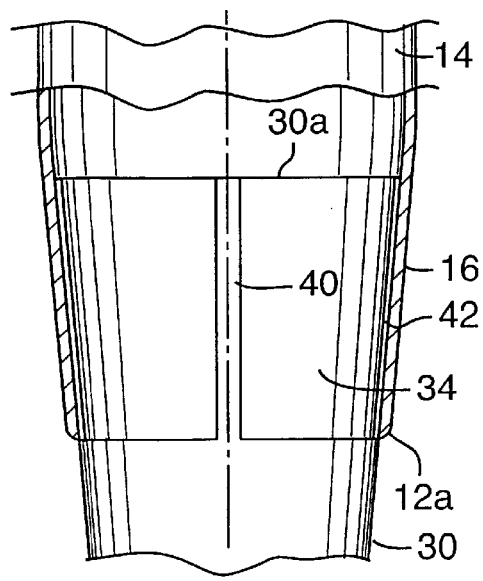
FIG. 4 is a view taken generally along the line 4—4 in FIG. 2, with a portion of the striking member broken away.

Referring to FIGS. 3 and 4, it will be seen that juncture section 34 of the handle member in the illustrated embodiment has a plurality of elongate, radially extending ribs, or projections, 40 on its outer surface. These ribs extend substantially longitudinally of the handle member, and are spaced apart circumferentially substantially equally about juncture section 34, or at approximately 120° from each other as illustrated.

Projections, or ribs, 40 extend outwardly from remainder portions of the juncture section of the handle member a distance substantially equal to the thickness of a layer of adhesive which it is desired to apply between juncture section 16 of the striking member and juncture section 34 of the handle member to secure these two members together to form the completed bat. It has been found desirable to apply a layer of adhesive between the juncture sections of the handle member and the striking member which is in a range of 0.001 to 0.010 inch thick, and preferably within a range of 0.002 to 0.005 inch thick. Thus ribs 40 project outwardly from remainder portions of juncture section 34 a distance in a range of 0.001 to 0.010 inch and more preferably in a range of 0.002 to 0.005 inch.

When assembled as illustrated in the drawings, the outer surfaces of projections 40 firmly engage the inner surface of juncture section 16 of the striking member, with a layer of adhesive filling the space between the circumferentially spaced ribs, or projections, to adhesively join the striking member to the handle member in this juncture section. A layer of such adhesive is indicated generally at 42.

Although projections 40 are shown as formed on the handle, it should be recognized that projections formed on the inner surface of the juncture section of the striking member and extending radially inwardly from remainder portions of the striking member could be used also.

Figure 5:
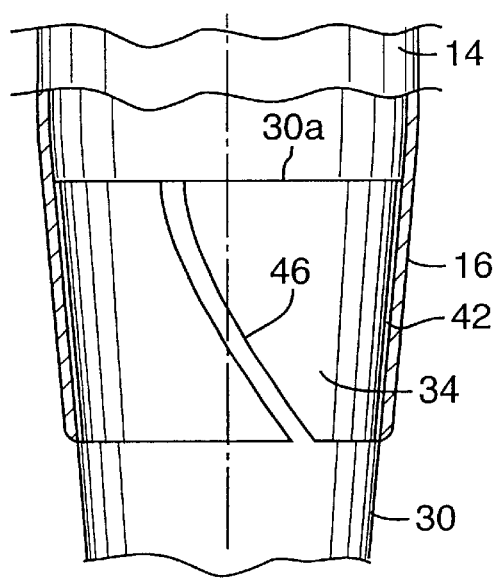
FIG. 5 is a view similar to FIG. 4, but with a different rib configuration.

FIG. 4 illustrates an embodiment of the invention in which the ribs 40 are substantially straight, and extend longitudinally of the handle member. FIG. 5 illustrates another embodiment in which the ribs 46 are curved, such that they extend somewhat helically about the outer surface of juncture section 34. They function similarly to ribs 40.

Although the projections, which may be formed on the external surface of the juncture section of the handle or on the internal surface of the juncture section of the striking member, have been illustrated and described generally as elongate ribs, it should be recognized that the purpose of such projections is to provide a firm contacting engagement between the juncture section portions of the handle member and striking member to produce a substantially rigid interconnection therebetween. Thus, the projections do not necessarily have to be elongate ribs as illustrated. Instead, there could be a plurality of projections of substantially any shape extending outwardly from remainder portions of the juncture section of the handle member or projecting inwardly from the inner surface of the juncture section of the striking member, or any combination thereof, such that firm interengagement is provided between the striking member and the handle member. For example the projections may be a pebbled surface configuration, crisscrossed ribs, irregularly shaped ribs, or any other configuration that provides a plurality of raised surfaces for direct contact with the other member to provide a substantially rigid interconnection between the handle member and the striking member.

The complementary converging and diverging configurations of the juncture sections of the striking member and handle member prevent the two parts from being pulled apart longitudinally in opposite directions, such as by pulling outwardly on opposite ends of the bat. The adhesive is provided to inhibit longitudinal movement of the handle member and striking member upon application of forces thereagainst such as might occur if forces were exerted at opposite ends of the bat in an attempt to compress them toward each other.

Although adhesive has been noted as a means for securing the two members against relative longitudinal movement in the one direction, it should be recognized that other means could be used also. For example, mechanical locking means of various types could be employed. Although not shown herein, the striking member or handle member could be formed with a radially projecting lip which engages a portion on the other member when the parts are moved into the positions illustrated in FIGS. 1–4 to prevent longitudinal separation of the members.

Further, although it has been mentioned that adhesive can fill the spaces between the projections, it is not necessary that the spaces between the projections always be filled, and a less than filling quantity of adhesive may be adequate.

When assembled as illustrated in the drawings, juncture section 34 of the handle member fits tightly within juncture section 16 of the striking member and a layer of adhesive interposed therebetween rigidly interconnects the striking member and handle member.

The fully assembled bat as shown in FIG. 1 includes a knob 48 secured to the proximal end 30b of the handle member and a plug 50 inserted in and closing the distal end 12b of the striking member. Referring to FIG. 1, a weighted member, or plug, 54 is inserted and secured in the proximal end portion of handle member 30. The structure and function of member 54 will be described in greater detail below.

A generally cylindrical transition sleeve 52 having a somewhat wedge-shaped cross section as illustrated in FIG. 2 is secured to handle member 30 to abut end 12a of the striking member to produce a smooth transition between end 12a of the striking member and the outer surface of handle member 30. Rather than applying a transition sleeve 52, the proximal end 12a of juncture section 16 of the striking member may be swaged to a gradually thinner edge region with a rounded proximal edge.

Describing a method by which the bat illustrated in the figures may be produced, striking member 14 is formed of a material and in a manner to provide desired impact, or striking capabilities. The striking member may be formed by swaging from aluminum tube (or other metal found appropriate for the striking region of a bat) to yield an integral weld-free member. While swaging is one means of producing such striking member, it should be understood that other methods of manufacturing might work equally as well.

The striking member is formed with a circular cross section having a striking region which has a cylindrical interior surface defining an interior cavity of a first selected cross sectional dimension, or diameter, $D_1$. This produces a striking member having a first effective mass. The effective mass may be a function of the specific gravity of the material, size, thickness, or other characteristics.

The juncture section 16 converges inwardly toward longitudinal axis 20 to an opening at end 12a having an internal diameter indicated $D_2$ which is less than $D_1$.

Insert 22 has an outer diameter corresponding generally to, but possibly slightly smaller than, $D_1$ such that it may be inserted into the striking portion 14 of striking member 12. Its proximal, or inner, end 22a may engage the beginning of the inward converging portion of juncture section 16 which prevents the insert from shifting further toward end 12a of the striking member. End 12b of the striking member 12 is bent over to form a circular lip with a bore extending therethrough. An end plug 50 is placed in the end of the bat to engage end 22b of the insert to hold it in place.

The striking member 12 may be formed of tubular metal material of a first specific gravity, which may be, but is not limited to, aluminum, steel, titanium, or other suitable metal material. The striking member also might be formed of composite or other suitable materials. Insert 22 also may be made of any such tubular metal or a composite. The insert serves a function as set out in prior U.S. Pat. Nos. 5,415,398 and 6,251,034. Since the striking member is formed separately from the handle member, the striking member may be formed in such a manner and from such materials as to produce the desired, or optimum, impact, or striking capabilities. Thus the requirements of the striking member and handle member are decoupled permitting each to be made of such materials and in such a manner as to provide optimum point location of mass in the bat and optimum strength and stiffness or flexibility where needed.

The handle member may be formed from material which produces a different, and generally a lower, effective mass than it would have if composed in a manner or of a material similar to that from which the striking member is formed. The different effective mass of the handle member may be a function of the specific gravity of the material forming the striking member, its size, thickness or other characteristics. For example the material of the handle member may have a different specific gravity than the material from which the striking member is formed.

In some instances the handle member may be formed of a composite material, such as carbon fiber, having a second specific gravity less than the first specific gravity of the striking member. In other instances the handle member may be formed of materials or in such a manner as to provide one or more operational or functional characteristics which differ from those which the handle member would have if merely formed in the same manner of the same material as the striking member. For example the handle may be formed from other materials such as titanium, aluminum, plastic or other appropriate material.

Figure 6:
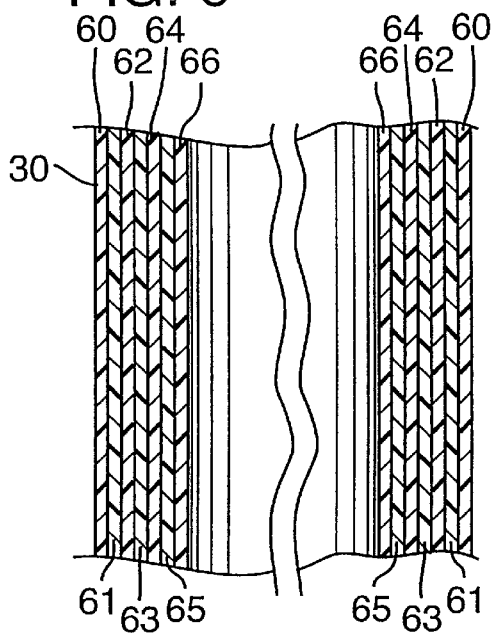
FIG. 6 is a magnified sectional view of a portion of the handle taken generally along the line 6—6 in FIG. 2.

Referring to FIG. 6, in a one embodiment the handle member includes multiple tubular composite layers as indicated generally at 60–66. The layers 60–66 are disposed adjacent each other and are arranged in a substantially concentric manner. The number of layers must be sufficient to withstand the swinging action of the bat, a gripping force applied thereto by a user, and the bending force imposed thereon when striking with the bat. However, preferably only the number of layers necessary to withstand such stresses would be provided, since more layers will add additional weight to the handle member. The number, position, and orientation of the multiple layers will vary depending upon the size and type of bat used. In one embodiment, the handle member may include the seven layers, 60–66, as shown. The number and thickness of layers and their position, and orientation may vary as needed to provide desired flexibility or stiffness and to withstand gripping forces and hitting stresses.

Each composite layer in the embodiment illustrated includes structural material to provide structural stability and matrix material to support the structural material. The structural material may be a series of fibers supported within the matrix material. Most of the layers include fibers that preferably extend substantially longitudinally of the handle member. When the bat strikes a ball, the greatest stress component on the handle member may be in bending, thus the majority of the fibers preferably are directed longitudinally to withstand these stresses. For example, the even numbered layers 60, 62, 64, 66 may be longitudinally extending layers, whereas odd numbered layers 61, 63, 65, which are fewer in number, may be circumferentially disposed layers. The longitudinally extending layers often are referred to as longitudinal, or 0° layers, since they have fibers that are directed substantially parallel to the longitudinal axis. The other layers may be what are termed 90° layers, or circumferential layers, since they have fibers, in which the majority thereof are directed at substantially 90° relative to the longitudinal axis. Specific layers may be constructed with fibers directed at substantially 90° relative to the longitudinal axis and other fibers directed at substantially 0° and woven together within each layer. Or the layers may be uni-directional layers wherein the fibers within the layers are parallel.

In this embodiment, the layers include carbon fibers. However the fibers could be other type of known fiber material, such as, but not limited to, Kevlar™, boron, or fiberglass. A metallic mesh also might be used.

The matrix in the layers preferably is sufficiently durable and has sufficiently high adhesion properties to continue supporting the structural material even after repeated use. In a preferred embodiment, the matrix material is a toughened epoxy. Alternatively, the matrix can be some other thermally setting resin such as a polyester or vinyl ester. A person skilled in the art will appreciate that a thermoplastic resin can be used, rather than a thermally setting resin.

In particularly preferred embodiments, the handle member 30 has a weight of about 158 grams and is formed with the number of layers between 28 to 40, wherein the weight of each layer varies from 0.6 to 14.0 grams. At least one layer of such embodiments is a braided layer having a percentage of the fibers within the braided layer extending longitudinally and the remaining fibers of the braided layer extending substantially circumferentially. Also, from 1 to 4 layers are formed with non-woven or non-braided fibers extending in two separate directions, such as, for example, 0 degrees and 90 degrees.

Additionally, in particularly preferred embodiments, the handle member 30 includes between 2 and 10 layers having longitudinally extending fibers. In particularly preferred embodiments, the handle member 30 includes a plurality of layers having helically extending fibers at various angles relative to the longitudinal axis, such as, for example, between 10 and 16 layers extend at plus or minus 30 degrees from the longitudinal axis, between 6 and 16 layers extend at plus or minus 45 degrees from the longitudinal axis, and 2 or less layers extend at plus or minus 60 degrees from the longitudinal axis.

Also, in particularly preferred embodiments, between 3 and 24 layers are formed of carbon fibers and between 13 and 25 layers are formed of fiberglass fibers. The layers are formed in a variety of different lengths varying from 5 cm to 67 cm. The layers, which are less than 67 cm, are placed at varying positions along the full length of the handle member. The layers are also formed in a variety of different widths ranging between 3.3 and 17.5 cm. Other layers have widths that vary along their length from between 0 to 17.5 cm. The number of layers having widths that vary along their length range between 8 and 11 layers. The fibers within layers are formed with an area fiber density of between 0.0143 and 0.048 grams/cm$^2$, and each layer can be formed with a weight in a range of 0.6 to 14 grams.

In alternative preferred embodiments, one or more of the characteristics of the handle member can be altered, such as, for example: the weight, size, thickness and stiffness of the handle member; the number, size, composition and orientation of the layers; and the composition, density, and orientation of the fibers within a layer. The handle member preferably has a weight within a range of 3 to 8 ounces. The handle member 30 can be formed without a braided layer or with an alternate number of braided layers. The handle member 30 can be formed with five or more layers of fibers wherein the non-woven fibers extend in two directions or with no such layers. Two or more of the layers can include other combinations of longitudinally, circumferentially and helically extending fibers. The handle member can be formed of multiple layers having helically extending fibers wherein any one layer can have fibers extending between plus or minus 1 to 89 degrees from the longitudinal axis. The fibers within the layers can be formed of other materials, such as, for example, glass, boron, graphite or other metal.

Figure 10:
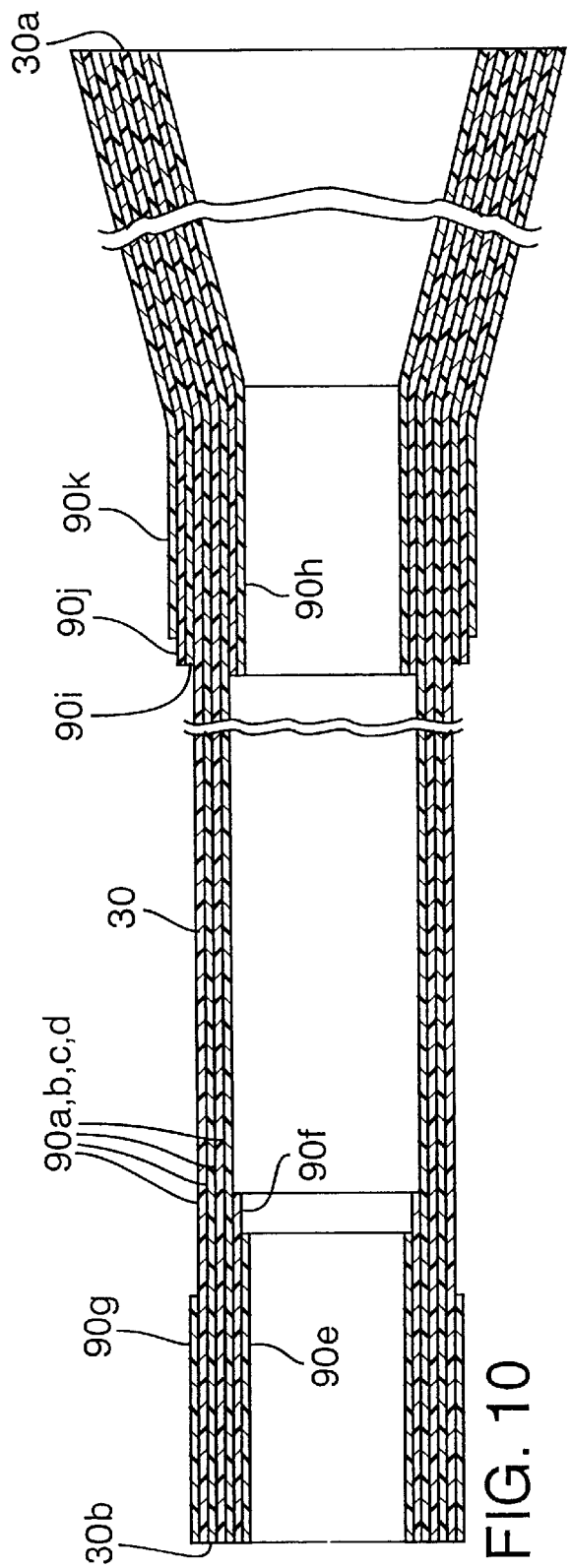
FIG. 10 is an enlarged longitudinal cross section of a handle member as may be used in the bat of FIG. 1, with portions broken away to illustrate composite lay up of the handle member with multiple composite material layers disposed at various regions along the length of the handle and with some sections of the handle having more layers than others and being composed of different materials to obtain selected handle member mass, strength and stiffness characteristics.

FIG. 10 is a simplified illustration of the manner in which multiple layers of fiber composite material may be assembled. As is shown some of the layers extend the full length of the handle (layers 90 a, b, c, d), while others are shorter and reside in selected regions of the handle member (90 e, f, g, h, i, j, k). Only a limited number of layers are shown in FIG. 10, for the sake of simplicity in the illustration.

The handle member includes a proximal gripping portion and a distal tapered portion, wherein one of the proximal gripping portion and the distal tapered portion is formed with a larger number of layers than the remaining portion. The characteristics of the handle member therefore can vary over its length.

The handle member 30, when formed of a composite material and produced in accordance with the present invention, can be produced with a stiffness, or resistance to bending along the longitudinal axis 20 of the bat 10, within the range of 200 to 1980 lbs/in. Preferably, the handle member 30 is formed with a stiffness or resistance to bending within the range of 400–900 lbs/in. (The term "lbs/in." refers to the amount of force in pounds applied perpendicular to the member to produce on inch of deflection in a test method described below.)

Figure 11:
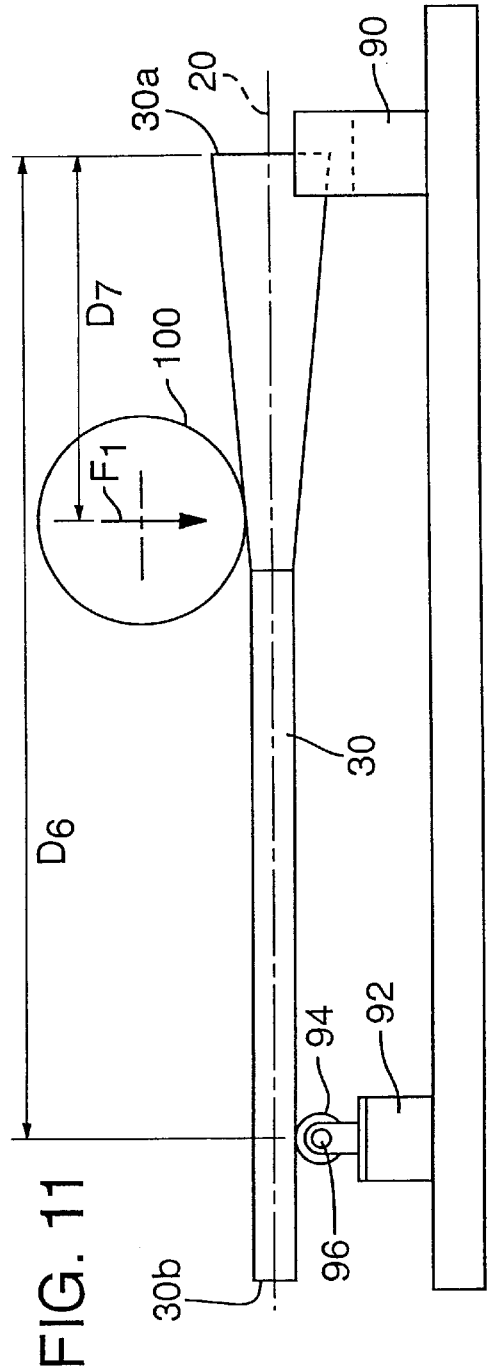
FIG. 11 is a side elevation view of a test fixture for testing the bending strength of a handle member with an exemplary handle member mounted therein for testing.

Referring to FIG. 11, the stiffness of the handle member 30 is determined through a three-point bend stiffness test wherein the handle member is placed upon first and second supports 90 and 92 of a universal test machine, or similar test machine, such as the universal test machine produced by Tinius Olsen Testing Machine Co., Inc. of Willow Grove, Pa. The first support 90 is a V-block support positioned at the distal end 30a of the handle member 30. The V-block support configuration of the first support 90 also serves to inhibit both longitudinal and transverse movement of the distal end 30a of the handle member 30. The second support 92 is a roller support including a roller 94 rotatable about a horizontal axis 96 spaced from V-block support 90 and positioned near the proximal end 30b of the handle member 30. For handle members 30 greater than or equal to 19 inches, the second support 92 is positioned a distance $D_6$ of 19 inches from support 90. The second support 92 also supports the handle member 30 in a first direction, preferably by maintaining the proximal end such that the longitudinal axis 20 of the bat 10 is in a horizontal position. The second support 92 enables the proximal end 30b to move longitudinally.

The third point of the bend stiffness test is provided by a crosshead 100 having a semi-circular shape. Preferably the semi-circular crosshead has a radius of 2.0 inches. The crosshead is configured to extend in a second direction opposite of the first direction. The crosshead may be moved downwardly onto the horizontally positioned handle member 30 with a force noted $F_1$ imposed thereon. The crosshead is connected to a load cell (not shown) which includes a strain gauge for measuring the load applied to the crosshead during displacement of the crosshead. The crosshead 100 is positioned a distance $D_7$ from the first support 90. Distance $D_7$ is in a range of 30% to 40% of distance $D_6$, and more preferably 7 inches, such that the semicircular crosshead contacts the handle member at a location approximately 7.0 inches from the distal end 30a of the handle member 30.

During testing, the handle member is positioned as described above. The crosshead is driven in the second direction at a speed of 1.0 inches per minute. As the crosshead moves in the second direction (i.e., downwardly in FIG. 12) the testing machine with input from the load cell calculates the load ($F_1$) per the lateral deflection, or displacement, of the handle member 30.

Figure 12:
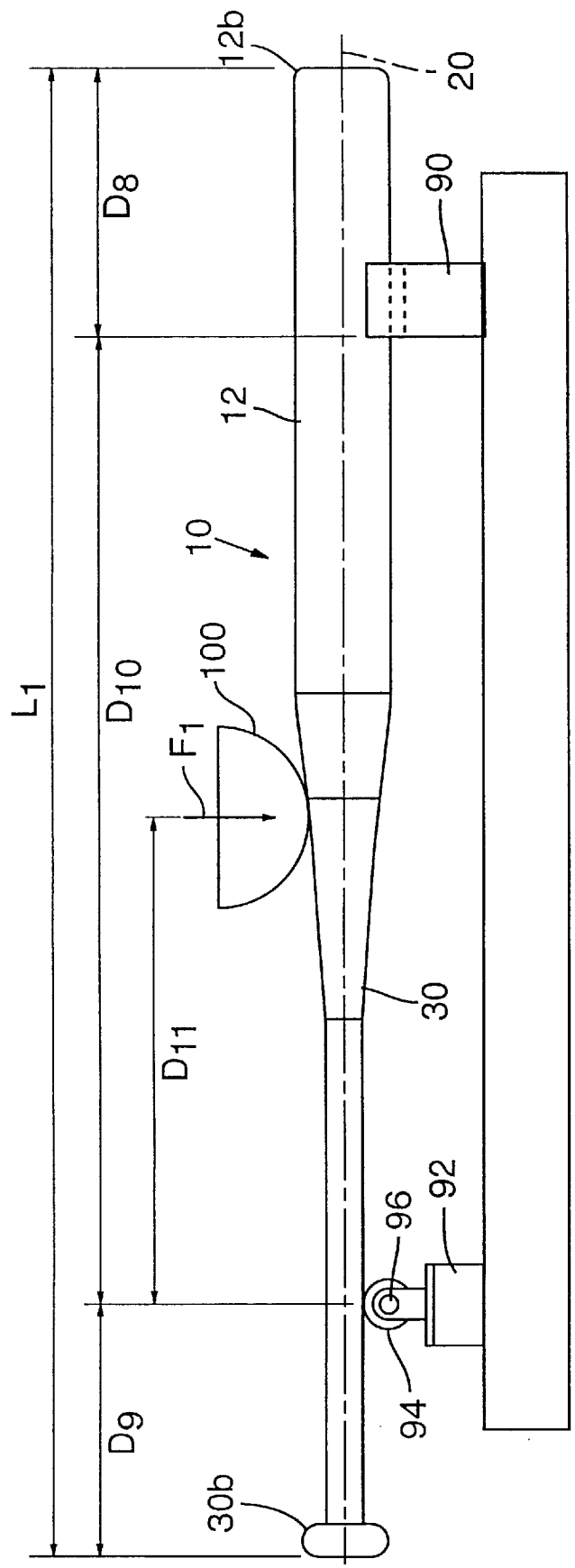
FIG. 12 is a side elevation view of a test fixture for testing the bending strength of a full length assembled bat with an exemplary handle member mounted therein for testing.

Referring to FIG. 12, the three-point bend stiffness test also can be performed on an assembled bat. When testing a bat the first support 92 is positioned such that a proximal side of the first support lies a distance $D_8$, which may be approximately 6 inches, from the distal end 12b of the striking member 12, and the second support 92 is positioned a distance $D_9$, which may be approximately 6 inches, from the proximal end 30b of the handle member 30. The distance between supports 90, 92 is noted at $D_{10}$ and the cross head is positioned a distance $D_{10}$ from support 92 which is approximately one half $D_{10}$ so as to contact the bat at a point between and equi-distant from the first and second supports.

During testing, the bat 10 is positioned as described above. The crosshead is driven in the second direction (downwardly in FIG. 12) at a speed of 0.5 inches per minute. As the crosshead moves in the second direction, the testing machine with input from the load cell calculates the load per displacement of the bat.

The bat 10 of the present invention can be formed such that the stiffness of the bat 10 is within the range of 400 to 2500 lbs/in. In particularly preferred embodiments, the bat 10 is formed with a stiffness, or resistance to bending, within the range of 500 to 1500 lbs/in, and more preferably in a range of 400–900 lbs/in. A conventional aluminum bat typically has a stiffness, or resistance to bending, of approximately 2200 to 2500 lbs/in.

The present invention enables the bat to be produced with significantly less stiffness and greater flexibility without negatively affecting the batting performance of the bat. The present invention enables one of ordinary skill in the art to vary the composition of the bat to produce a bat that is optimally configured, adjusted or tuned to meet the needs of a particular player. The present invention enables one of ordinary skill in the art to produce a bat that optimizes flexibility and, through the direct connection between the handle member and the striking member, maximizes energy transfer between the handle and striking members, and the power output of the bat.

It should be noted that examples set out herein are only exemplary in nature, and should not be considered limiting as to the structure and method of manufacture of bats according to the invention. For example, although the bat has been described with a metal striking member and a composite handle member, such a wide difference in materials for the two members may not be necessary. For example, the striking member and the handle member both may be made of composite material, but with constructions which provide varying operational or functional characteristics beneficial for the specific portion of the bat which they form.

In constructing the bat of the illustrated embodiment the striking member 12 may be formed as set out above. End 12b initially remains cylindrical, without the bent over portion as illustrated in FIG. 1.

The tubular handle member may be formed by wrapping sheets of preimpregnated composite material on a mandrel. A first layer is wrapped on the mandrel, followed by a second layer, etc., until the desired number of layers have been wrapped on the mandrel in the desired positions and orientations to form the tubular handle member. The mandrel has a configuration which produces both the elongate substantially cylindrical gripping portion 32 and the diverging frusto-conical juncture section 34.

To form projecting ribs 40, and referring to FIGS. 7–9, after a sufficient number of layers of preimpregnated composite material have been wrapped onto the mandrel, a plurality of forming members indicated generally at 70, 72, 74 having a selected arcuate configuration are placed on the outside of the juncture section of the handle member while the composite material is still malleable. FIG. 7 shows members 70, 72, 74 prior to placement on the outside of the juncture section 34 and the placement of such is illustrated in dashed outline in FIG. 7. As is seen members 70, 72, 74 do not extend fully about the juncture section when placed thereon, but instead have gaps therebetween.

Members 70, 72, 74 have a thickness substantially equal to the desired projection for ribs 40 and the space between adjacent edges of elements 70, 72, 74 is the desired width of ribs 40.

As mentioned previously the projections may be in forms other than elongate ribs and other molding or forming members may be provided to achieve the desired projection configurations.

When the forming members are placed against the juncture section as noted, the tubular member then may be wrapped in shrink tape and placed in an oven between 250 and 300° F. for about 45 minutes to one hour. The shrink tape preferably is temperature resistant and has high shrinkage and compaction capability when heated. As the shrink tape contracts it presses the composite layers into a desired configuration about the forming mandrel and presses members 70, 72, 74 into the composite material as seen in FIG. 8 to form depressions between areas which become projecting ribs 40. The depressions are indicated generally at 76, 78, 80, respectively, having a depth equal to the thickness of members 70, 72, 74. FIG. 9 illustrates the configuration thus produced when members 70, 72, 74 are removed.

Heating the handle member speeds the curing process, but it may be allowed to cure at a lower temperature for a longer period of time. For example, the handle member may be allowed to cure at room temperature for several days. The pressure applied by the shrink tape may range from 15 to 150 psi depending both on the type of the shrink tape used and the flow properties of the matrix material used. Alternately, some other known apparatus may be used to pressurize the handle member during curing, such as a bladder or a vacuum bag.

The handle member (or striking member if chosen to do so) also may be formed of a chopped fiber slurry. The chopped fibers can be carbon, glass, fiberglass, boron, or various metals.

Although not illustrated in the figures, it should be recognized that other methods may be used for forming the handle and providing a desired series of projections thereon. One method of doing so is to wrap sheets of pre-impregnated composite material onto a mandrel as previously described to form the general configuration for the handle with its cylindrical gripping portion and flared frusto-conical juncture section. The materials wrapped on the mandrel then may be placed in a clam shell style mold having the desired external configuration for the handle, including forms to produce a selected pattern of projections thereon. After the clam shell mold has been placed about the exterior of the handle, the forming mandrel is removed, a pressure bladder is inserted where the mandrel previously had been, and pressure is applied on the bladder to force the wrapped materials outwardly against the mold. The materials then are allowed to cure and are removed from the mold with the desired external configuration.

Although the handle member has been described using a plurality of sheets of impregnated composite material, the layers may be formed by some other method, such as a filament winding process. With a filament winding process, a continuous fiber, rather than a preimpregnated sheet as described above, is wrapped around a mandrel. The filament winding process may use a preimpregnated fiber. Alternatively, the continuous fiber may run through a resin bath before it is wrapped onto the mandrel. The filament winding process typically winds the fiber in a helical path along the mandrel, making it difficult to produce a layer having fibers that are exactly 90 degrees relative to the longitudinal axis of the layers. Thus the layers may include layers that are at an angle substantially 90 degrees, but not exactly at 90 degrees.

The handle member, being produced of composite material, permits selective production to obtain a handle member of the desired weight while still obtaining the necessary strength and stiffness.

After the handle member has been formed it is inserted through the open end 12b of striking member 12, such that gripping portion 32 extends longitudinally outwardly from end 12a of the striking member. Prior to inserting the handle member a layer of adhesive is applied either to the outer surface of juncture section 34 of the handle member or the inner surface of juncture section 14 of the striking member. The striking member 12 and handle 30 are urged in opposite directions along the longitudinal axis, such that the juncture section 34 of the handle member is forced into tight engagement with the interior surface of juncture section 16. As this occurs, the adhesive applied between the parts is pressed into recesses 76, 78, 80 and ribs 40, or other projections, firmly contact, or engage, the inner surface of juncture section 16. Excess adhesive will be allowed to flow outwardly from end 30a of the handle member, with only the selected thickness of adhesive remaining.

It has been found that an adhesive such as Scotch-Weldm™ DP-100 epoxy adhesive or PT 1000 urethane adhesive from Willamette Valley Co., of Eugene, Oreg., works well in this application. Other appropriate adhesives also may be used. In a preferred embodiment, projections 40 extend outwardly from remainder portions of the outer surface of the juncture section of the handle member in a range of 0.001 to 0.010 inch, and more preferably in a range of 0.002 to 0.005 inch and have a width in a range of 0.125 to 0.75 inch and more preferably in a range of 0.2 to 0.3 inch. The layer of adhesive will have a thickness generally equal to height of the projections and is allowed to cure and form a substantially rigid, firm interconnection between the striking member and the handle member. The substantially rigid interconnection between the juncture sections of the striking member and handle member provided by the adhesive and direct engagement of the projections with the inner surface of the striking member permits substantially complete striking energy transfer between the handle member and the striking member.

After the handle member has been secured to the striking member, insert 22 is inserted into the striking member, the outer end 12b is rolled over into the configuration illustrated in FIG. 1, and stop member 50 is inserted therein. Transition member 52 (when used) is attached to provide a smooth transition between the inner end 12a of the striking member and handle 30.

Prior to, or following, assembly of the handle member and striking member, weighted member, or plug, 54 is inserted and secured in the proximal end portion of the handle member as shown in FIG. 1.

Weighted plug 54 is a generally cylindrical member coupled to the proximal end 30b of the handle member 30. The weighted plug preferably is sized to fit snugly within the proximal end 30b of the handle member 30 and preferably is affixed to the proximal end 30b with a suitable adhesive. Alternative means for coupling the plug 54 to the proximal end 30b of the handle member 30 also are contemplated, such as, for example, press-fit connections, fasteners, and other mechanical latching mechanisms. The weighted plug 54 is formed of a relatively dense material, preferably a metal. Alternatively, the weighted plug 54 can be formed of other materials, such as, for example, sand, a fluid or a polymeric material. The plug 54 is formed with a weight in the range of 0.5 to 7.0 ounces, and preferably within a range of 2 to 5 ounces, and a length in the range of 1.0 to 4.0 inches.

The weighted plug 54 places additional weight, or mass, generally directly beneath the player's grip during swinging, thereby facilitating the player's ability to swing the bat and to increase his or her bat speed. The weighted plug 54 provides the player with a pivot point, which facilitates rotation of the bat about the mass or grip location of the player.

Additionally, the weighted plug 54 also serves to dampen, or substantially reduce, the shock, vibration and "sting" commonly felt by a player when hitting a ball, particularly when the ball is hit away from a desired hitting region of the striking member, or the "sweet spot." The weighted plug 54 serves as a vibration sink that substantially lowers the amplitude of the vibrational energy generated upon impact of the bat 10 with a ball at the location of the plug 54 thereby reducing the vibration or shock felt by the player. In another alternative preferred embodiment, the plug 54 is integrally formed with the knob 48.

The use of the weighted plug 54 is just one example of the advantages achieved in the present invention from redistributing the weight, or mass, within the bat 10 through decoupling of the handle member 30 and the striking member 12. When forming the handle member 30 of a composite material, the weight of the handle member 30 can be reduced from that of a conventional metal handle member. This weight can then be redistributed to other locations on the bat, such as at the proximal end of the handle member 30 to improve, or tune, the performance of the bat 10. In the present invention, the weighted plug 54 can be added to the bat 10 to enable the player to increase his or her bat speed, and to reduce the shock and vibration felt by the user, without excessively or unnecessarily increasing the weight of the bat 10. In another alternative preferred embodiment, weight can be redistributed to the striking member 12.

The method described herein and the bat produced provide a bat which has improved striking capabilities. Such improved striking capabilities are provided by the structural characteristics of the bat. In one instance increased bat swing speed is allowed by producing a bat with a handle which is lighter than would be the case if it were made of the same material or in a manner similar to the striking portion of the bat. This reduction in weight of the handle in relation to the striking portion and providing a substantially rigid interconnection between the two permits increased bat speed and substantially complete striking energy transfer between the striking member and the handle member. Further it provides desirable weight distribution in the bat with the greatest effective mass in the striking region and lower effective mass in the handle.

It also has been found that the slugging, or hitting, characteristics of the bat may be varied by mating various composite handle members with striking members of different materials or configurations, with a substantially rigid interconnection therebetween. Thus different models of bats may be produced, tuned to selected requirements.

By providing a bat constructed with an independently produced striking member and handle member which are rigidly interconnected at a juncture region, bats may be made with numerous selected functional characteristics. The striking member may be made of materials which provide optimum ball striking effectiveness, while the handle member may be constructed in such a fashion that is allows the batter to impart the maximum possible force from the batter's hands to the bat and to produce the greatest swing speed. The handle member may be laid up from a variety of composite materials with selected thicknesses, orientations, and positions within the handle member to produce desired strength, weight, stiffness, etc., in the overall handle or even within selected regions of the handle.

Explaining further, selected regions of the handle may have a greater or lesser number of layers of composite material than other regions, the thicknesses or structural materials within the layers may vary at different regions of the handle member, and other characteristics may be varied through selected lay up of materials in the handle member during production.

As an example of desirable differences in handle members which may be formed, it has been found that certain bats, such as for softball use, will work better with a stiffer handle member, whereas for baseball a more flexible, or less stiff, handle member is preferable.

With the structure and method for producing such set out herein, a bat may be optimized for the selected usage by selection of materials and lay up for the various components of the bat.

While there have been illustrated and described preferred embodiments of the present invention, it should be appreciated that numerous changes and modifications may occur to those skilled in the art and it is intended in the appended claims to cover all of those changes and modifications which fall within the spirit and scope of the present invention.

What is claimed is:

1. A method for constructing an elongate bat having a longitudinal axis comprising the steps of:

forming an elongate tubular striking member having a circular cross section with a proximal end, a distal end, a striking region therebetween, and a juncture section adjacent said proximal end converging toward said axis on progressing toward said proximal end to form a mouth of a first diameter, forming an elongate handle member of composite material having a circular cross section having a proximal end, distal end and juncture section adjacent said distal end which diverges from said axis on progressing toward said distal end to a second diameter greater than said first diameter, assembling the striking member and handle member by inserting the handle member into the striking member with at least a portion of the outer surface of the juncture section of the handle member engaging a portion of the inner surface of the juncture section of the striking member, and remainder portions of said handle member extending longitudinally from said proximal end of the striking member, and joining the juncture section of the handle member to the juncture section of the striking member to provide a rigid interconnection between the striking member and the handle member, wherein the step of forming the handle member comprises positioning plural composite layers adjacent each other to form a tubular member, and curing said layers, and, wherein at least one molding member is impressed against the outside of said handle member during forming to produce spaced apart projections on said juncture section of the handle member with said projections extending outwardly from remainder portions of said handle member.

2. The method of claim 1, wherein said molding member is removed following curing.

3. The method of claim 1, wherein said projections are formed as elongate ribs extending substantially longitudinally of said handle member.

4. The method of claim 1, wherein said ribs are positioned to engage the inner surface of said juncture section of the striking member when assembled.

5. The method of claim 1, wherein said molding member produces projections in a range of 0.002 to 0.005 inch in height.

6. The method of claim 1, wherein in said joining step adhesive is applied between said juncture sections and cured.

7. The method of claim 1, wherein said striking member is formed of a material having a first specific gravity and said handle member is formed of a composite material having a second specific gravity different from said first specific gravity.

8. The method of claim 1, wherein the diverging portion of the juncture section of the handle member is formed in a configuration complementary to the converging portion of the juncture section of the striking member.

9. The method of claim 1, wherein the step of forming the handle member comprises the steps of positioning plural composite layers containing structural fibers therein adjacent each other such that each layer is tubular, and orienting the layers such that the majority of the layers have fibers extending at an angle less than about 50° relative to the longitudinal axis of the handle member.

* * * * *